United States Patent Office 2,799,584
Patented July 16, 1957

---

2,799,584

METHOD OF PRODUCING BONE-FREE MEAT AND POULTRY PRODUCTS

Harry J. Robertson, Atlanta, Ga.

No Drawing. Application October 26, 1953,
Serial No. 388,443

8 Claims. (Cl. 99—107)

This invention relates to food products and more particularly to a method of treating meat or poultry to remove bone and cartilage therefrom in order to produce a bone-free poultry or meat product.

Heretofore, bone-free poultry and meat products have been prepared and marketed, but the cost thereof has been in some instances almost prohibitive because of the difficulty of separating the bone or cartilage from the meat, which in many cases has been done entirely by hand. While mechanical operations such as grinding or comminuting have heretofore been used, these have only partially assisted in producing a bone-free meat or poultry product and great difficulty has been experienced in completely separating the bone or cartilage from the meat resulting in a product which is not completely bone-free and where all bone or cartilage has been removed the product has proven costly.

It is accordingly an object of this invention to provide a method of treating bone containing meat or poultry in such a manner as to remove all bone and cartilage therefrom without requiring extensive manual manipulation, thereby producing a bone-free meat or poultry product which may be economically produced for marketing at a reasonable cost.

A further object of the invention is the provision of a method of treating bone containing meat or poultry in such a manner as to substantially eliminate the necessity for manual operations to remove all bone and cartilage in order to provide a bone-free product.

A still further object of the invention is the provision of a method of treating bone-containing meat or poultry in which all bone and cartilage is removed and requiring the addition of a minimum quantity of fluid and in which all or part of such fluid may be removed in order to provide a bone-free meat or poultry product having any desired consistency.

Another object of the invention is the provision of a method of treating bone-containing meat or poultry by non-manual operations which results in a bone-free meat or poultry product which may be used in salads, as a spread, as a filler for containers of relatively large pieces of meat or poultry, as an infant food and any other use where bone-free meat or poultry products are required.

Further objects and advantages of the invention will be apparent from the following description.

Briefly stated, the invention contemplates the treatment of bone-containing meat or poultry by cooking the same to shrink the meat away from the bone, grinding or comminuting the cooked product to reduce the same to a particle size of one-quarter inch or smaller, adding sufficient liquid to the mixture to permit flow thereof, centrifuging the mixture to remove all bone and cartilage and finally removing excess fluid to provide a bone-free product.

The cooking step may be performed initially or after the grinding or comminuting operation, but preferably the bone-containing meat or poultry will be first cooked at a sufficient temperature and for a sufficient period of time to cause shrinkage of the meat from the bone and it is contemplated that during the remainder of the process the mixture will be maintained at a temperature of from 140 to 180 degrees F. Maintaining the mixture in this range of temperatures imparts sufficient fluidity to the mixture so that the addition of only a minimum amount of fluid, such as water or broth, is needed to permit flow of the mixture and proper treatment thereof throughout the process.

After cooking the mixture is reduced in particle size by the action of a colloidal mill or other suitable apparatus to such an extent that the particle size of the mixture is not greater than one-quarter inch and many of the particles may be as small as one micron or smaller.

The comminuted mixture is then fed by gravity, or by any other suitable means to a centrifuge which, depending on the consistency of the mixture, may be rotated at speeds varying from 100 to 10,000 or more revolutions per minute. This centrifuging of the mixture results in completely separating the bone and cartilage therefrom and if desired, the resulting bone-free product may be treated in any further desired manner, such as by the addition of other poultry or meat products, the addition of cereals or other extenders and furthermore, the consistency of the product may be determined by removing excess moisture therefrom in any desired manner, such as open kettle heating, vacuum drying, additional centrifuging or by any other desired or applicable method of removing excess moisture from a product. The bone containing residue may be additionally treated, if desired, by further centrifuging either alone or in conjunction with other treating operations, to recover additional bone-free meat.

It will be seen that by the above described process there has been provided a method of obtaining a bone-free meat or poultry product which requires substantially no manual operations other than introducing the bone containing meat or poultry to the cooking apparatus and packaging the resulting bone-free product and consequently, this product can be very economically produced and sold in a highly competitive market. The temperatures necessary, the quantity of additional liquid required and the speed of the centrifuge are not extremely critical and consequently, adequate control of the process is a relatively simple matter. It has been found, however, that the efficiency of the process depends to a great extent on the centrifuging operation, since it is during this step that the bone or cartilage is actually separated from the meat.

It will be obvious to those skilled in the art that various changes may be made in the invention without departing from the spirit and scope thereof and therefore, the invention is not limited by that which is described in the specification, but only as indicated in the appended claims.

What is claimed is:

1. The method of producing a bone-free meat product comprising cooking bone-containing meat to cause shrinkage of said meat from said bone, maintaining said meat and bone at a temperature of 140 to 180 degrees F., comminuting said meat and bone to provide a mixture having a particle size not greater than one-quarter inch, adding sufficient liquid to said mixture to permit flow thereof, centrifuging said mixture to remove all bone and removing excess liquid to provide a bone-free meat product.

2. The method of producing a bone-free meat product comprising cooking bone containing meat to cause shrinkage of said meat from said bone, maintaining said meat and bone at a temperature of 140 to 180 degrees F., comminuting said meat and bone to provide a mixture of relatively fine particles, adding sufficient liquid to said mixture to permit flow thereof, centrifuging said mixture to remove all bone and removing excess liquid to provide a bone-free meat product.

3. The method of producing a bone-free meat product comprising cooking bone and liquid containing meat to cause shrinkage of said meat from said bone, maintaining said meat and bone at a temperature of 140 to 180 degrees F., comminuting said meat and bone to provide a mixture of relatively fine particles, centrifuging said mixture to remove all bone and removing excess liquid to provide a bone-free meat product.

4. The method of producing a bone-free meat product comprising cooking bone containing meat to cause shrinkage of said meat from said bone, comminuting said meat and bone to provide a mixture of relatively fine particles, adding sufficient liquid to said mixture to permit flow thereof, centrifuging said mixture to remove all bone and removing excess liquid to provide a bone-free meat product.

5. The method of producing a bone-free meat product comprising cooking bone containing meat to cause shrinkage of said meat from said bone, maintaining said meat and bone at a temperature of 140 to 180 degrees F., comminuting said meat and bone to provide a mixture having a particle size not greater than one-quarter inch and centrifuging said mixture to remove all bone therefrom.

6. The method of producing a bone-free meat product comprising comminuting said meat and bone to provide a mixture having a particle size not greater than one-quarter inch, cooking said mixture to cause shrinkage of said meat from said bone, maintaining said mixture at a temperature of 140 to 180 degrees F., and centrifuging said mixture to remove all bone therefrom.

7. The method of producing a bone-free poultry product comprising cooking bone-containing poultry meat to cause shrinkage of said meat from said bone, maintaining said meat and bone at a temperature of 140 to 180 degrees F., comminuting said meat and bone to provide a mixture having a particle size not greater than one-quarter inch, adding sufficient water to said mixture to permit flow thereof, centrifuging said mixture to remove all bone, and removing excess water to provide a bone-free meat product.

8. The method of producing a bone-free poultry product comprising cooking bone-containing poultry meat to cause separation of said meat from said bone, comminuting said meat and bone to provide a mixture of relatively fine particles, adding sufficient water to said mixture to permit flow thereof, centrifuging said mixture to remove all bone, and removing excess water to provide a bone-free meat product.

References Cited in the file of this patent

UNITED STATES PATENTS

| | | |
|---|---|---|
| 1,697,857 | Dyer | Jan. 8, 1929 |
| 2,622,027 | Torr | Dec. 16, 1952 |
| 2,622,028 | Torr | Dec. 16, 1952 |